US010192535B2

(12) United States Patent
Sepulveda

(10) Patent No.: US 10,192,535 B2
(45) Date of Patent: Jan. 29, 2019

(54) SYSTEM AND METHOD FOR TRANSMITTING LOW FREQUENCY VIBRATIONS VIA A TACTILE FEEDBACK DEVICE

(71) Applicant: Backbeat Technologies LLC, Novi, MI (US)

(72) Inventor: Yerko Sepulveda, Novi, MI (US)

(73) Assignee: Backbeat Technologies LLC, Novi, MI (US)

( * ) Notice: Subject to any disclaimer, the term of this patent is extended or adjusted under 35 U.S.C. 154(b) by 0 days.

(21) Appl. No.: 15/977,404

(22) Filed: May 11, 2018

(65) Prior Publication Data
US 2018/0336870 A1 Nov. 22, 2018

Related U.S. Application Data

(60) Provisional application No. 62/507,318, filed on May 17, 2017.

(51) Int. Cl.
G10H 1/12 (2006.01)
G10H 1/32 (2006.01)
H04R 1/02 (2006.01)
H02K 35/02 (2006.01)
G08B 6/00 (2006.01)
G10H 3/18 (2006.01)

(52) U.S. Cl.
CPC ............... G10H 1/12 (2013.01); G08B 6/00 (2013.01); G10H 1/32 (2013.01); G10H 3/186 (2013.01); H02K 35/02 (2013.01); H04R 1/02 (2013.01)

(58) Field of Classification Search
CPC . G10H 1/12; G10H 1/32; G10H 3/186; G08B 6/00; H02K 35/02; H04R 1/02
USPC ............................................. 84/736
See application file for complete search history.

(56) References Cited

U.S. PATENT DOCUMENTS

| 5,866,836 A | 2/1999 | Bergstrom | |
| 5,959,230 A * | 9/1999 | Fulford | G04F 5/025 84/464 R |
| 6,727,419 B1 * | 4/2004 | Diaz | A63B 71/0686 368/278 |
| 7,582,822 B1 * | 9/2009 | Olander-Waters | G04F 5/025 84/484 |
| 2004/0079220 A1 * | 4/2004 | Yagi | G09B 15/00 84/484 |
| 2004/0099132 A1 * | 5/2004 | Parsons | G04F 5/025 84/730 |
| 2004/0100366 A1 * | 5/2004 | Parsons | G04F 5/025 340/407.1 |
| 2005/0171458 A1 | 8/2005 | Luden et al. | |
| 2006/0102171 A1 * | 5/2006 | Gavish | A61B 5/0816 128/95.1 |

(Continued)

Primary Examiner — Jeffrey Donels
(74) Attorney, Agent, or Firm — Honigman Miller Schwartz and Cohn LLP

(57) ABSTRACT

A device for providing a tactile feedback response to a user. The device includes a housing, an electrical circuit, a tactile transducer and an input connection. The electrical circuit includes a frequency filter circuit and an amplifier circuit. The tactile transducer includes an electrical coil and a magnet. The input connection is configured to receive an electrical signal. The electrical circuit transforms the electrical signal making it suitable for moving at least a portion of the tactile transducer, at least indirectly, against a portion of the user's body.

16 Claims, 14 Drawing Sheets

(56) References Cited

U.S. PATENT DOCUMENTS

2007/0038164 A1     2/2007   Afshar
2014/0348348 A1   11/2014   Efrati
2017/0325039 A1* 11/2017   Khwaja .................... G08B 6/00
2018/0084362 A1*   3/2018   Zhang ...................... H04R 3/00

* cited by examiner

| coil | |
|---|---|
| former diameter (mm) | 31 |
| former material is aluminum | |
| former material thickness (mm) | 0.1 |
| former height (mm) | 14 |
| wire diameter (mm) | 0.16 |
| wire material solid copper, NOT copper clad aluminum | |
| total length (mm) | 42000 |
| total coil DC resistance (ohms) | 36 |
| single conductor | yes |
| wound around outside of former | yes |
| bonded with adhesive to former | yes |
| turns | 45 |
| layers | 9 |
| coil winding height (mm) | 9 |

FIG. 10F

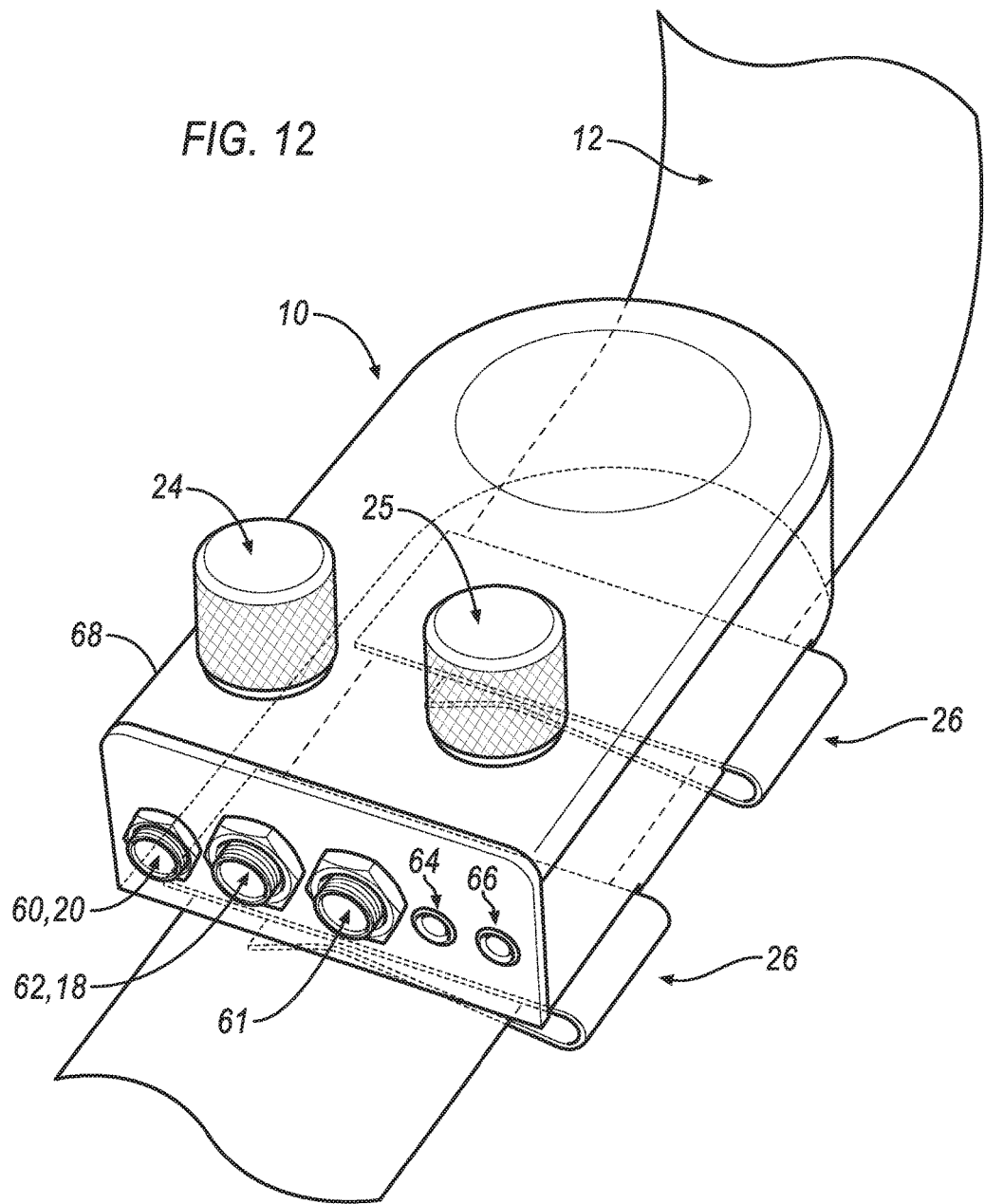

SYSTEM AND METHOD FOR TRANSMITTING LOW FREQUENCY VIBRATIONS VIA A TACTILE FEEDBACK DEVICE

CROSS-REFERENCE TO RELATED APPLICATIONS

This U.S. patent application claims priority to U.S. Provisional Application 62/507,318 filed on May 17, 2017 the disclosure of which is considered part of the disclosure of this application and is hereby incorporated by reference in its entirety.

TECHNICAL FIELD

This disclosure relates to a system and method for transmitting low frequency vibrations via a tactile feedback device.

BACKGROUND

Crucial to a good musical performance is a musician's confidence of knowing and hearing what he or she is playing. When the bass is low or lost in a crowded sound mix, a musician can often feel anxiety and loss of confidence, which may result in a poor performance or an overall negative experience. Modern musicians often utilize headphones, earphones, or in-ear monitors to receive auditory feedback from their own instruments as well as from the instruments of other musicians. Most headphones, earphones, or in-ear monitors lack adequate low-frequency drivers, thereby low tone sound is unable to be heard satisfactorily. To compensate, musicians often raise the overall volume to an unhealthy decibel level, or play harder which can add additional stress to their hands and fingers.

Low frequency tones are intuitively more felt than heard, and are most effectively transmitted through direct physical contact with the vibrations generated by sound. One characteristic of a live musical performance in a stadium or large auditorium is the presence of expensive performance equipment, such as amplifiers and large arrays of speakers. The amplifiers increase the signal level from a musical instrument, such as a bass guitar, and subsequently the amplified signal level drives the large array of speakers. These speakers are usually located behind the bassist. The bassist has the ability to adjust the tone of the speakers. Furthermore, the large array of speakers provide auditory and tactile feedback of the music being played. The speakers produce pressure sound waves which can be felt on the back of the bassist, affirming feedback consistent with what the bassist is playing. Not only does this tactile feedback assure the musician of what he or she is playing, it provides a larger sensory experience that goes beyond auditory and extends into the tactile realm.

However, this heightened sensory experience is not available to musicians who do not have access to the aforementioned performance equipment or where this equipment is not desired, such as an orchestra pit or quiet stage. Moreover, this tactile sensory experience is not available when a musician practices, which is often in a small space without a full musical accompaniment. Therefore, there is a need for a system and method for transmitting low frequency vibrations via a tactile feedback device.

SUMMARY

One aspect of the disclosure provides a device for providing a tactile feedback response to a user. The device includes a housing, an electrical circuit, a tactile transducer, and an input connection. The electrical circuit is within the housing. The electrical circuit includes a frequency filter circuit, and an amplifier circuit. The tactile transducer is within the housing. The tactile transducer includes a coil and a magnet. The tactile transducer is communicatively coupled to the electrical circuit. The input connection is configured to receive an electrical signal. The input connection is communicatively coupled to the electrical circuit. The electrical circuit transforms the electrical signal making it suitable for moving at least a portion of the tactile transducer, at least indirectly, against a portion of the user's body.

Implementations of the disclosure may include one or more of the following optional features. In some implementations, the amplifier circuit is capable of increasing the power of the electrical signal to approximately 20 watts. In some examples, the tactile feedback response is not dependent on the transmission of acoustic energy through air.

In some configurations, the frequency filter circuit is configured to pass the electrical signals with frequencies in the range of approximately 10-130 Hz.

In some examples, the tactile transducer includes an electrical coil, and the coil is configured to have a resistance of greater than approximately 30 ohms, and a current draw of approximately 0.4 amps or less. The tactile transducer further includes a magnet and the magnet is moveable by current passing through the coil thereby generating movement that is felt, at least indirectly, by the user.

In some configurations, the device further includes a support strap for supporting a musical instrument. The tactile transducer is detachably connected to the support strap by an attachment apparatus. In some implementations, the tactile transducer is detachably connected directly to a musical instrument. In some examples, the tactile transducer is encased within the support strap.

In some configurations the device further comprises a headphone output connection, a through output connection and an audio input connection. The headphone output connection is configured to be detachably coupled to headphones. Furthermore, an output electrical signal which replicates the electrical signal outputted from the headphone output connection can be monitored by the user. The headphone output connection is communicatively coupled to the electrical circuit. The through output connection is configured to output the electrical signals to external components. The through output connection is communicatively coupled to the electrical circuit. The audio input connection is configured to receive an electrical signal from at least one music signal source. The audio input connection is communicatively coupled to the electrical circuit.

Another aspect of the disclosure provides a method for providing a tactile feedback response to a user. The method includes receiving, at a device, electrical signals generated by a musical instrument. The device includes an electrical circuit and a tactile transducer. The method includes transforming, at the device, the electrical signals received from the musical instrument into a tactile feedback response. The method further includes conveying the tactile feedback response to the user, whereby the device generates vibrations that are felt by the user.

This aspect may include one or more of the following optional features. In some implementations, the tactile transducer includes a coil and a magnet. The coil is configured to have a resistance of greater than approximately 30 ohms and a current draw of approximately 0.4 amps or less. The magnet is configured to be moveable thereby generating vibrations that are felt by the user.

In some configurations, the device is detachably connected to a strap of the musical instrument by means of an attachment apparatus. In some implementations, the device is detachably connected directly to the musical instrument. In some examples, the device is encased within the strap of the musical instrument.

Another aspect of the disclosure provides a system for providing a tactile feedback response to a user. In some configurations, the system includes a musical instrument and a device. The musical instrument is configured to generate electrical signals. The device is configured to receive and transform the electrical signals generated by the musical instrument into a tactile feedback response. The device includes an electrical circuit and a tactile transducer. The device conveys the tactile feedback response to the user by generating non-acoustic vibrations that are felt by the user.

This aspect may include one or more of the following optional features. In some implementations, the tactile transducer includes a coil and magnet. The coil is configured to have a resistance of greater than approximately 30 ohms and a current draw of approximately 0.4 amps or less. The magnet is configured to be moveable thereby generating vibrations that are felt by the user.

In some configurations, the device is detachably connected to a strap of the musical instrument by means of an attachment apparatus. In some implementations, the device is detachably connected directly to the musical instrument. In some examples, the device is encased within the strap of the musical instrument.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 10F is a table showing exemplary dimensions of the coil portion of an example tactile transducer.

FIG. 12 is another perspective view of an example tactile feedback device.

DETAILED DESCRIPTION

Figure 1:
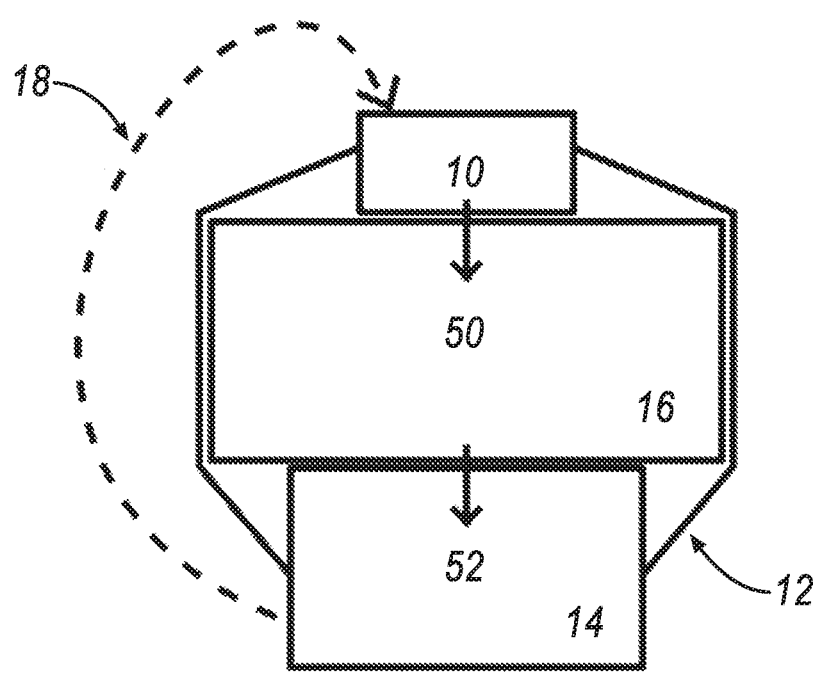
FIG. 1 is a mechanical schematic depiction of an example tactile feedback response cycle.

Referring to FIG. 1, in some implementations, a tactile feedback response cycle consists of a user 16 playing a musical instrument 14, wherein the musical instrument 14 is attached to the user 16 via a strap 12, and a tactile feedback response device 10 is attached to the strap 12. This configuration results in the device 10 being in direct continuous physical contact with the user 16.

Furthermore, a feedback cycle is created when the user 16 provides a manual input 52 to the musical instrument 14, e.g. the musical instrument 14 is played. The manual input 52 results in the musical instrument 14 generating electrical signals 18 which are subsequently transmitted to the device 10. The device 10 transforms the electrical signals 18 into a tactile feedback response 50, e.g. vibrations, which are felt by the user 16.

Figure 2:
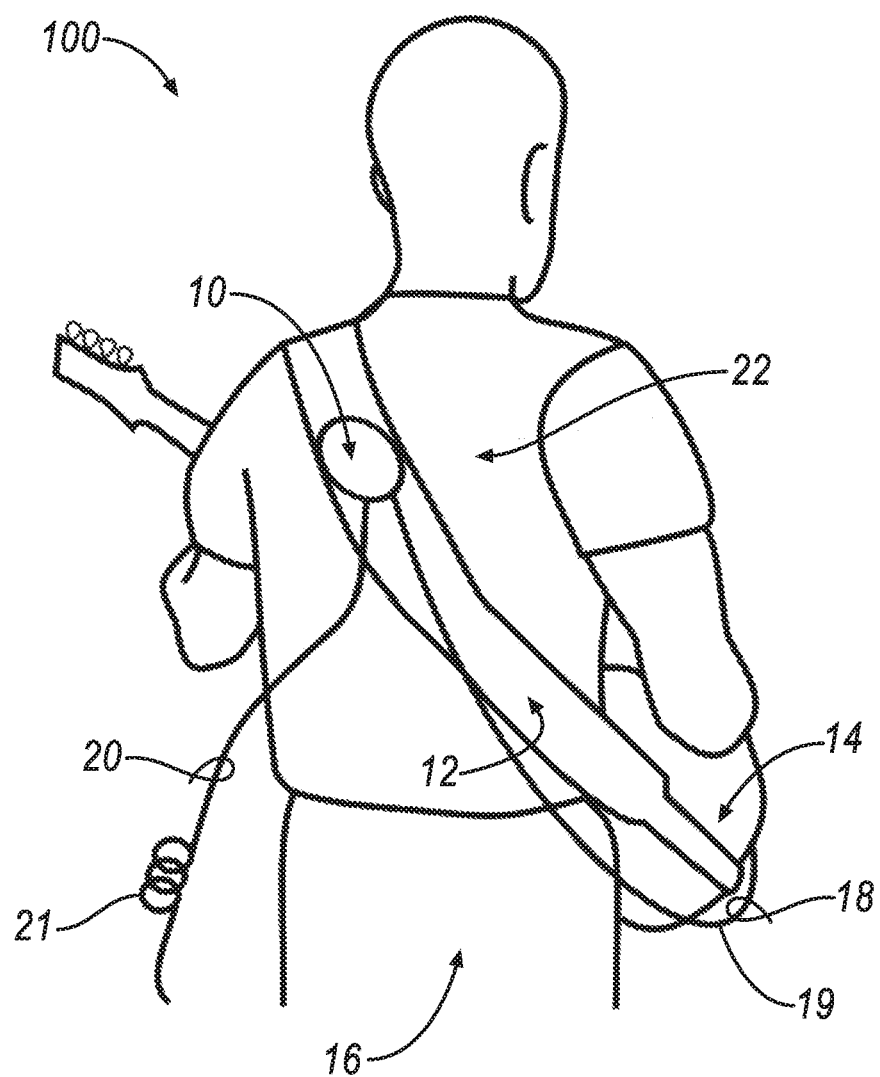
FIG. 2 is a perspective view of a first embodiment system for transmitting low frequency vibrations to a musician via a tactile feedback device.

Referring to FIG. 2, in some implementations, a system 100 for transmitting low frequency vibrations via a tactile feedback device 10 includes a user 16, a musical instrument 14, a strap 12, and a tactile feedback device 10. The user 16 is a musician, such as a bassist, who plays the musical instrument 14. The musical instrument 14 may be an electric guitar, an electric bass guitar, a keyboard, etc.

In some examples, the musical instrument 14 is attached to the user 16 via a strap 12, such as a guitar strap, and the tactile feedback device 10 is detachably connected to the strap 12. The strap 12 may wrap around the user's 16 back and/or shoulders in order to securely connect the musical instrument 14 to the user 16.

Moreover, the strap 12 holds the musical instrument 14 firmly against the clothing or other apparel worn by the user 16 by force of gravity or by mechanical means. The device 10 is firmly attached to the strap 12. The firm contact between the device 10, strap 12, and user 16 is essential for the user 16 to effectively and accurately feel the tactile feedback response from the device 10. The device 10 could also be used in direct contact with the skin of the user 16, i.e. with or without intermediate clothing present therebetween.

In some configurations, a contact area 22 is the location on the user 16, in which the user 16 is in direct physical contact with the device 10. The contact area 22 is the region in which the user 16 feels the vibrations generated from the device 10. The contact area 22 may be on a user's 16 back, waist, abdomen, leg, arm, shoulder or any additional body part capable of being strapped in firm and continuous contact with the device 10.

In some examples, the musical instrument 14 contains strings under tension that produce mechanical vibrations when the musical instrument 14 is played, e.g. the user 16 strums the strings. Subsequently, the musical instrument 14, through use of electromagnetic pickups, converts the mechanical string vibrations into electrical signals 18. The string vibrations are standing waves of unique frequencies which correlate to the output of the electrical signals 18. The electromagnetic pickups, in the musical instrument 14, generate alternating electrical signals 18 in the range of +/−5 volts spanning across the humanly audible frequency range of about 20 to 20,000 Hertz.

In some configurations, the electrical signals 18 are generated by the musical instrument 14, and transmitted to the device 10 via a cable 19. However, the electrical signals 18 may also be transmitted to the device 10 in a wireless fashion, such as through electromagnetic radiation, radio waves, infra-red signal, etc.

Additionally, power via a power source 20 may be supplied to the device 10 via a cable 21. The power source 20 may be alternating current or direct current. The power source 20 may originate from an external permanent source, e.g. wall socket, or from a temporary source, e.g. lithium-ion battery. Furthermore, the power source 20 may be internal to the device 10, such as a temporary or permanent battery installation. The power supplied by the power source 20 will be used to operate the functions of the device 10, which may include auxiliary devices, such as lights, headphones, and electrical signal outputs. Furthermore, in some configurations, the cable 21 may be used to recharge the internal battery power source 20.

Figure 3:
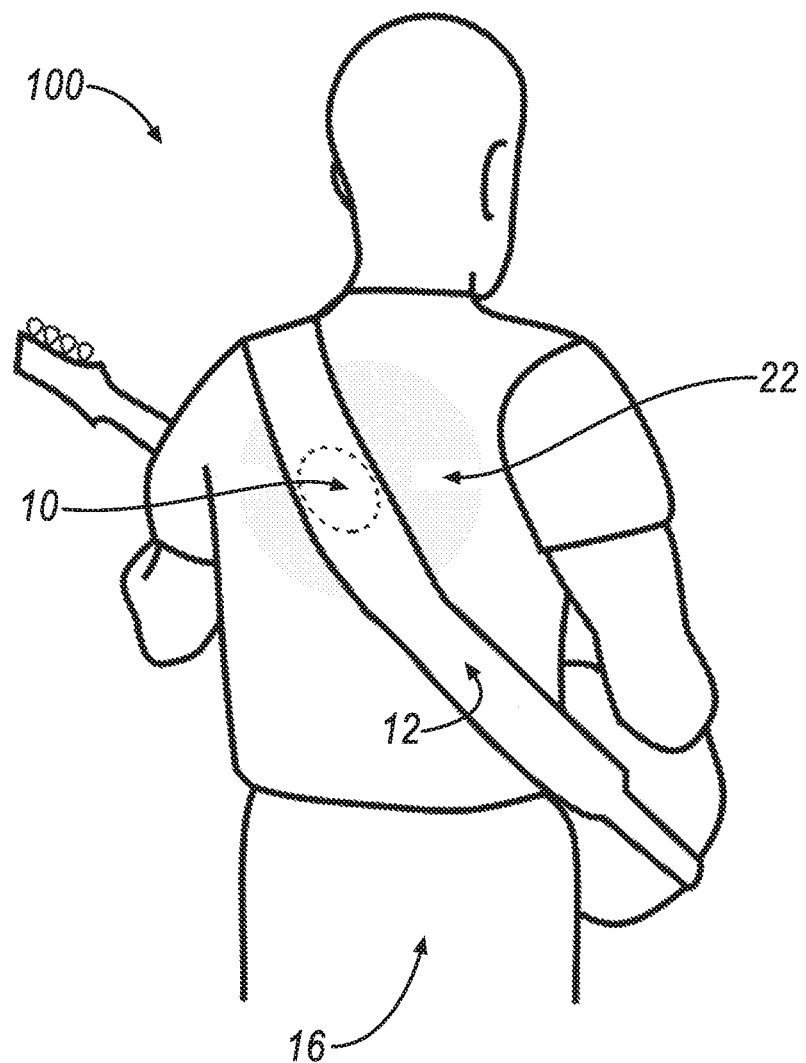
FIG. 3 is another perspective view of a second embodiment system for transmitting low frequency vibrations via a tactile feedback device.

FIG. 3 is an example system 100 for transmitting low frequency vibrations via a tactile feedback device 10, in which the device 10 is encased within the strap 12. The combination of the strap 12 and the device 10 results in them acting as one mass when a vibration is applied from the device 10. The contact area 22 is located in the mid to upper back on a user 16. The contact area 22 is defined as the area bounded by the user's 16 neck, shoulder blades, and lower back. Alternative contact areas may be desirable depending on the user's 16 individual preference.

In the case of the musical instrument 14 being an electric guitar, the weight of the guitar is sufficient to hold the strap 12 and the device 10 in firm, continuous, and direct physical contact with the user 16. In the event the musical instrument 14 has minimal mass, the force of gravity may be insufficient to allow for adequate physical contact, therefore the strap 12 may be fashioned to include mechanical restrictors to ensure sufficient contact amongst the user 16, strap 12, and device 10.

Figures 4A, 4B:
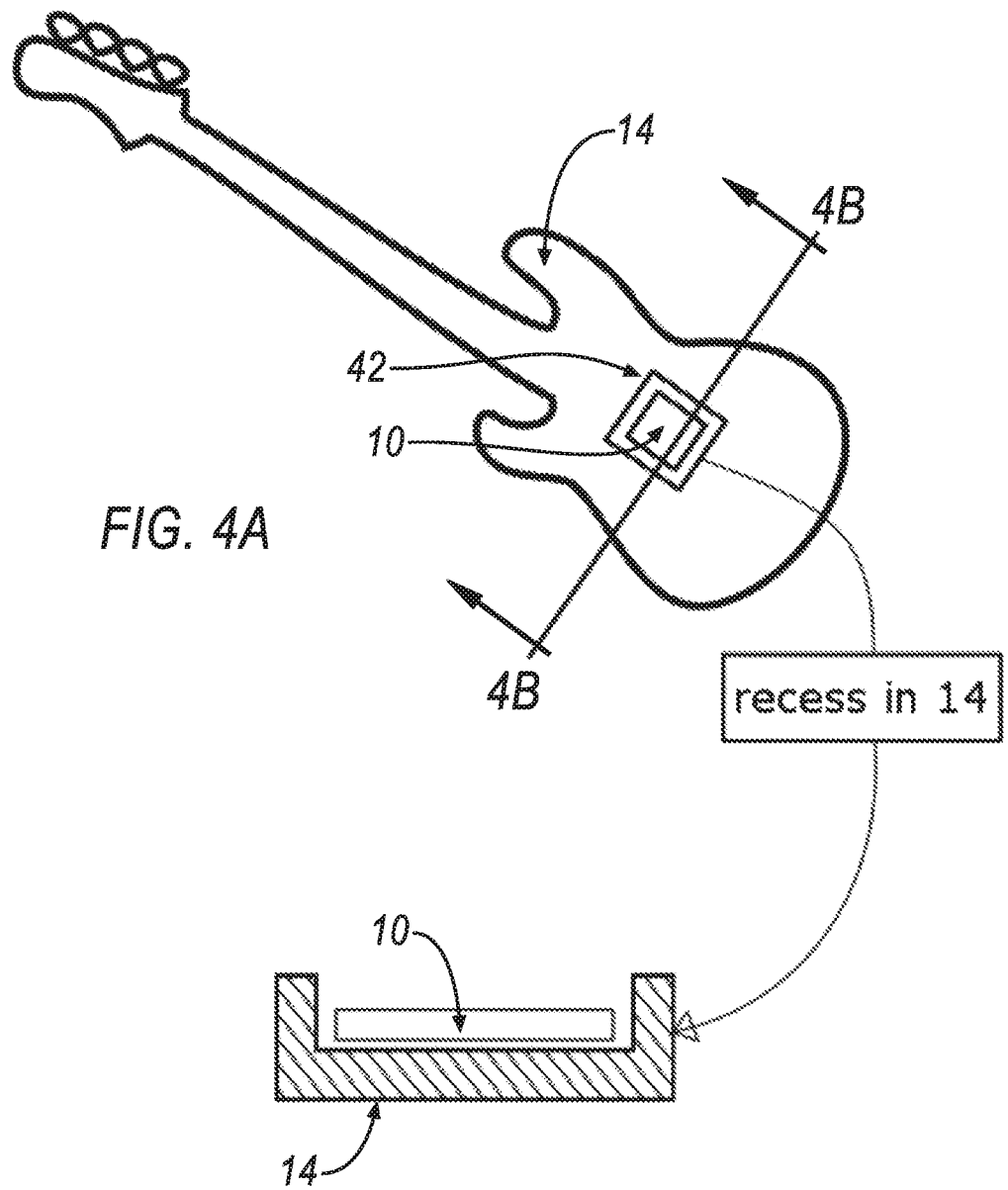
FIG. 4A is a perspective view of an example tactile feedback device detachably connected directly to a musical instrument.
FIG. 4B is a partial cross-sectional view taken through line 4B-4B of FIG. 4A.

Now referring to FIG. 4A and FIG. 4B, an example tactile feedback response device 10 is shown attached directly to a musical instrument 14. The musical instrument 14 may include a recess region 42, in which the device 10 is installed. The device 10 may be detachably installed by means of clips, straps, snaps, screws, bolts, magnets, or adhesives. This configuration ensures adequate contact between the user 16 and the device 10, in order for the user 16 to feel the appropriated tactile feedback response. Furthermore, in some examples, the device 10 may be installed within or surface mounted to the musical instrument 14.

Figure 5:
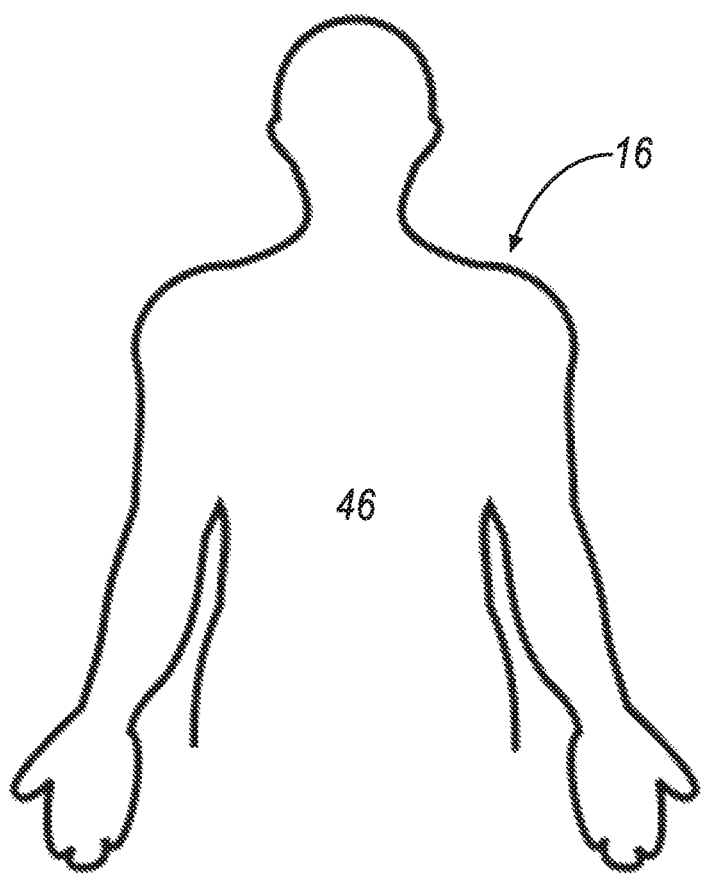
FIG. 5 is a silhouette of a user showing exemplary contact regions suitable for placing the tactile feedback device defined in FIG. 4A and FIG. 3.

Referring to FIG. 5, shown is a contact region 46 located on a user 16 for the example tactile feedback device defined in FIG. 4A and FIG. 4B. Since the device 10 is installed directly to the musical instrument, the contact region 46 will be located on the user's 16 abdomen.

Figure 6:
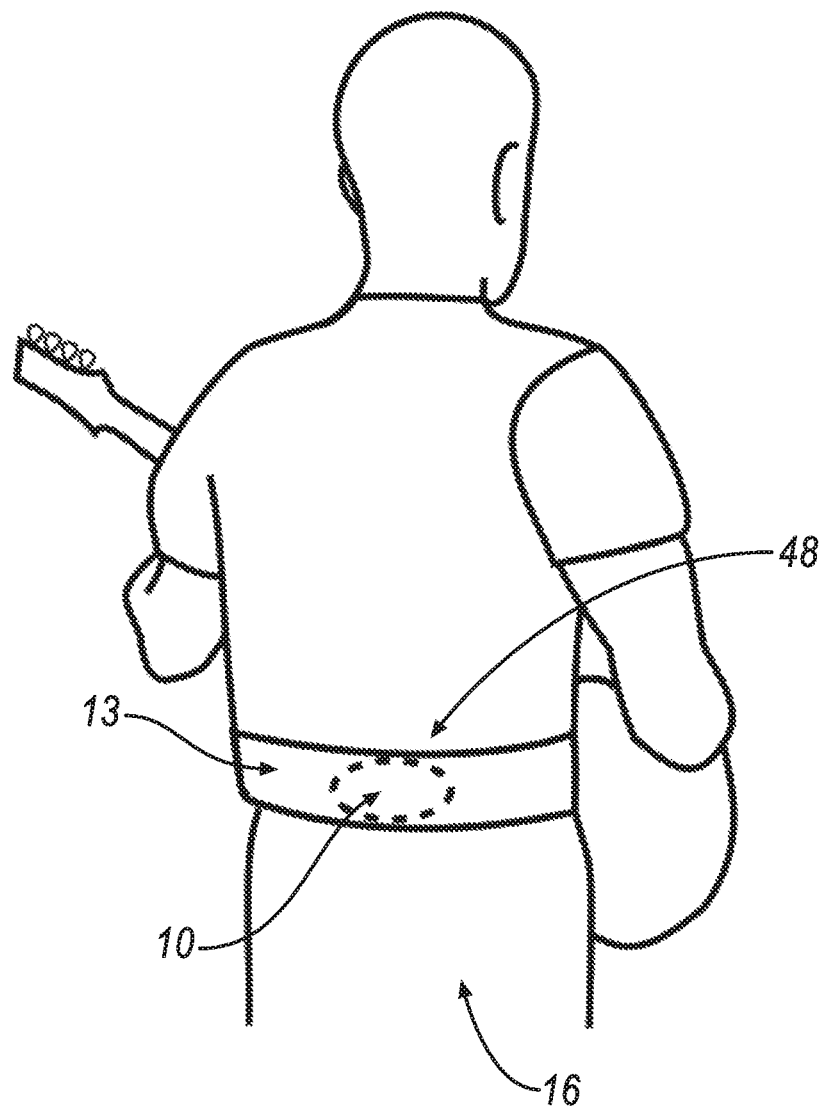
FIG. 6 is another perspective view of an example system for transmitting low frequency vibrations via a tactile feedback device.

Now referring to FIG. 6, in some implementations, the user 16 may elect to wear a belt 13 in lieu of the aforementioned guitar strap. The tactile feedback response device 10 may be attached directly to the belt 13, or it may be encased within the belt 13. Moreover, if the user 16 selects to wear the belt 13, the user 16 will feel the tactile feedback response generated from the device 10 in a contact region 48 located on the user's 16 lower back.

Figure 7:
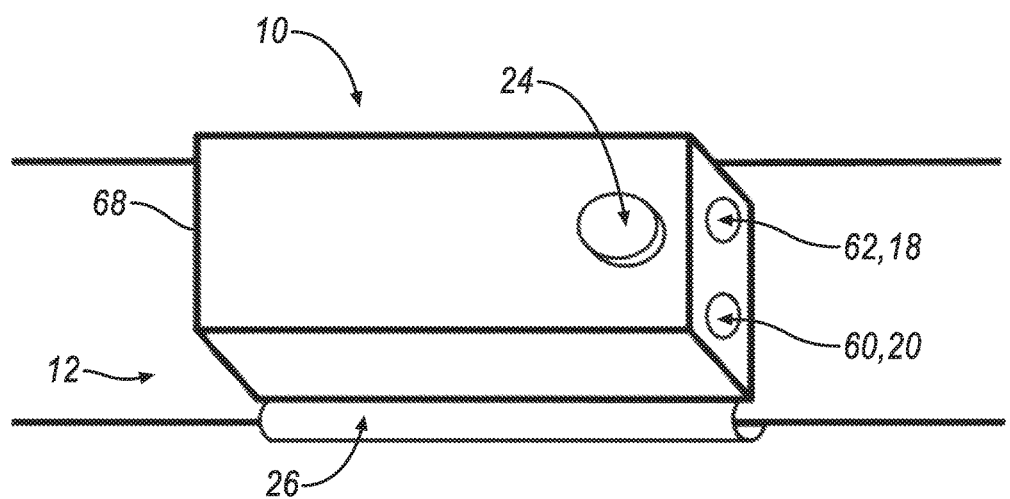
FIG. 7 is front/side view of an encasement for housing components of the tactile feedback device.

Referring to FIG. 7, in some implementations, the tactile feedback response device 10 includes a housing 68, a transducer potentiometer 24, an electrical signal input connection 62, an electrical power source input connection 60, and an attachment apparatus 26. The housing 68 is the outer portion of the device 10, which encloses and provides protection for all of the device's 10 internal components. The housing 68 is made of a rigid material, such as a metal or a plastic.

In some examples, the transducer potentiometer 24 controls the amplitude of the vibrations generated by the device's 10 tactile transducer. The transducer potentiometer 24 may be a variable resistor that includes a knob component, which the user 16 can rotate in order to increase or decrease the amplitude of the vibrations generated by the device 10. The transducer potentiometer 24 may also come in a format such as a dial, slider, or thumbwheel. Moreover, the transducer potentiometer 24 allows the user 16 to set the tactile feedback response to the desired level.

In some implementations, in lieu of the aforementioned transducer potentiometer 24, the device 10 may be configured so the amplitude of the tactile feedback response may be controllable by a wired or wireless controller independent from the device 10. This allows someone, other than the user 16, to have control over the device's 10 output.

In some examples, the device 10 is configured to include an electrical signal input connection 62, and an electrical power source input connection 60. The electrical signal input connection 62 is configured to receive a cable or wire from the musical instrument 14. The musical instrument 14 generates electrical signals 18 which are transmitted to the device 10 via the cable or wire. The electrical power source input connection 60 is configured to receive a cable or wire from a power source. The power source transmits power to the device 10 via the cable or wire.

Figure 8:
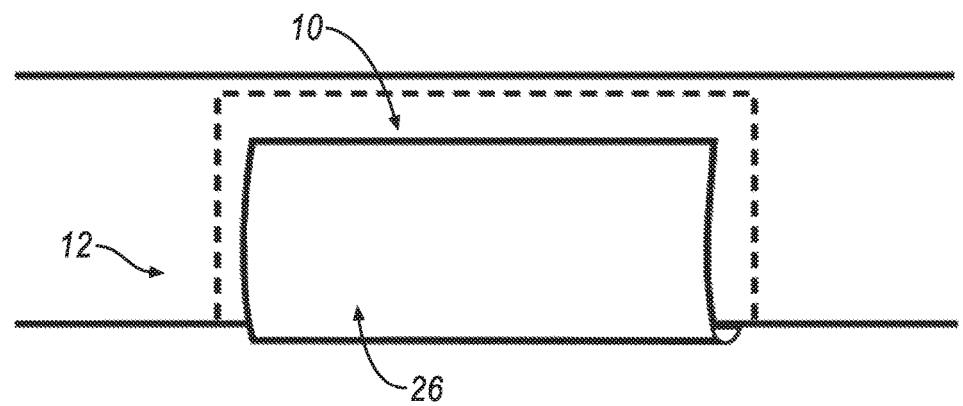
FIG. 8 is a back view of an example attachment apparatus defined in FIG. 7.

Now referring to FIG. 8, the device 10 is attached to the guitar strap 12 via an attachment apparatus 26. The attachment apparatus 26 may be one or more clips, webbing, belt, adhesive, or magnetic. The attachment apparatus 26 allows the device 10 and strap 12 to function as one mass in order for the vibrations generated from the device 10 to be efficiently conveyed to the user 16.

Figure 9:
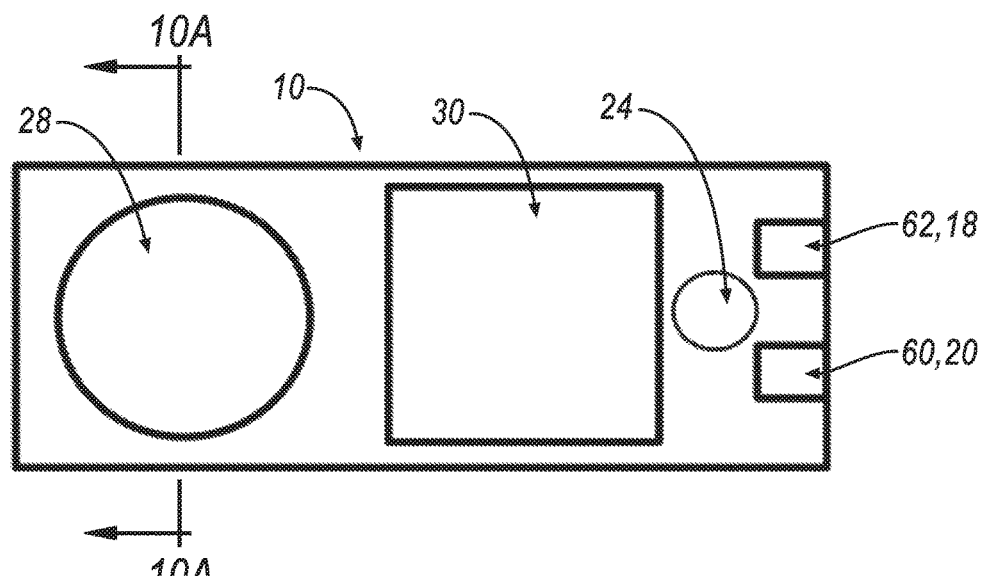
FIG. 9 is an internal view of some components of an example tactile feedback device.

FIG. 9 is an example of inner components of a tactile feedback response device 10. In some configurations, the device 10 includes a tactile transducer 28, a circuit board 30, a transducer potentiometer 24, an electrical signal input connection 62, and an electrical power source input connection 60. The circuit board 30 is communicatively coupled to the tactile transducer 28, the transducer potentiometer 24, the electrical signal input connection 62, and the electrical power source input connection 60.

In some examples, the tactile transducer 28 is bonded within the device 10, and it generates low-frequency vibrations. The tactile transducer 28 is actuated by an electronically buffered, electronically filtered, and electronically amplified electrical signal 18. The tactile transducer 28 comprises a mass, which substantially follows the movement patterns of the buffered, filtered, and amplified electrical signal 18. The tactile transducer 28 exerts physical vibration forces on both the weight and the body of the device 10. The tactile transducer 28 produces movements that are imparted to the user's body. This can be accomplished by directly pressing the transducer 28 against the user's skin (i.e. imparting vibrations directly to the user's body) or by pressing the transducer 28 against clothing or other wearables of the user (i.e. imparting vibrations indirectly to the user's body). In an embodiment, the current invention does not generate acoustical energy. Accordingly, it does not rely on the coupling of acoustical energy between the transducer 28 and the user or the user's wearables to transmit low-frequency vibrations which can be detected by the tactile senses of the user.

In some implementations, the tactile transducer 28 may be physically separate from the device 10. Moreover, in some examples, the tactile transducer 28 may include a coil and a magnet. The coil includes a moving magnetic mass that generates vibrations.

Figure 10A:
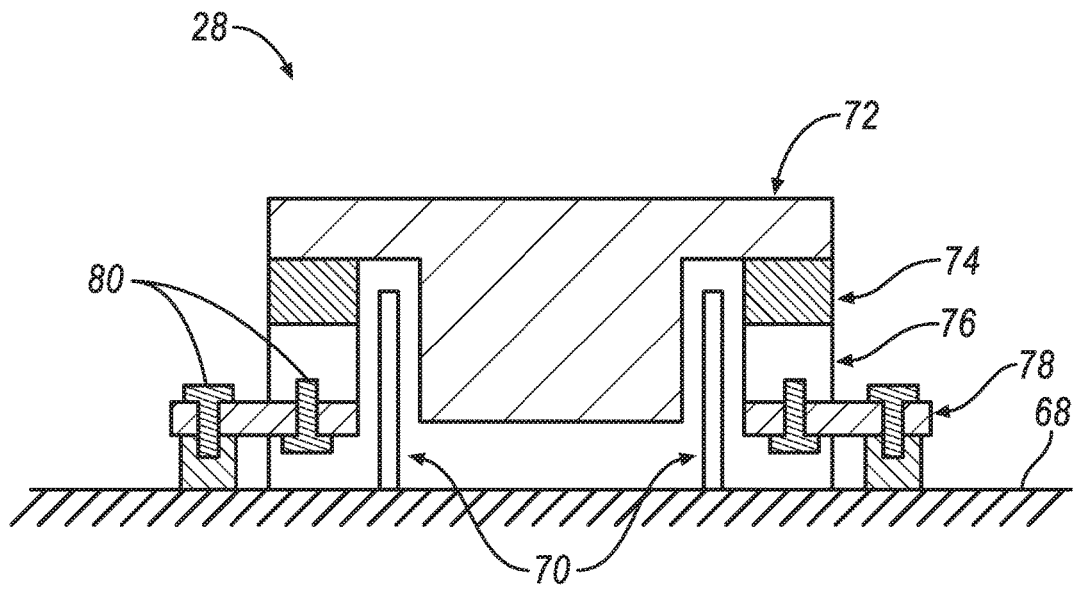
FIG. 10A is a cross-sectional view of an example tactile transducer taken through line 10A-10A defined in FIG. 9.

Now referring to FIG. 10A, in some implementations, the tactile transducer 28 is enclosed by a housing 68, and includes a coil 70, a magnet 74, a T-yoke 72, a top plate 76, a spring disc 78, and screws 80. The coil 70 is a copper conductor wound around a bobbin multiple times. The magnet 74 is configured so that a magnetic field intersects the copper conductor perpendicularly. When a current is sent into the coil 70, in the presence of a magnetic field, a Lorentz force is created. This force results in the relative movement between the coil 70 and the magnet 74. The tactile transducer 28 transforms a signal current into a proportional force. In some examples, the coil 70 is stationary, and the magnet 74 is free to move.

Figure 10B:
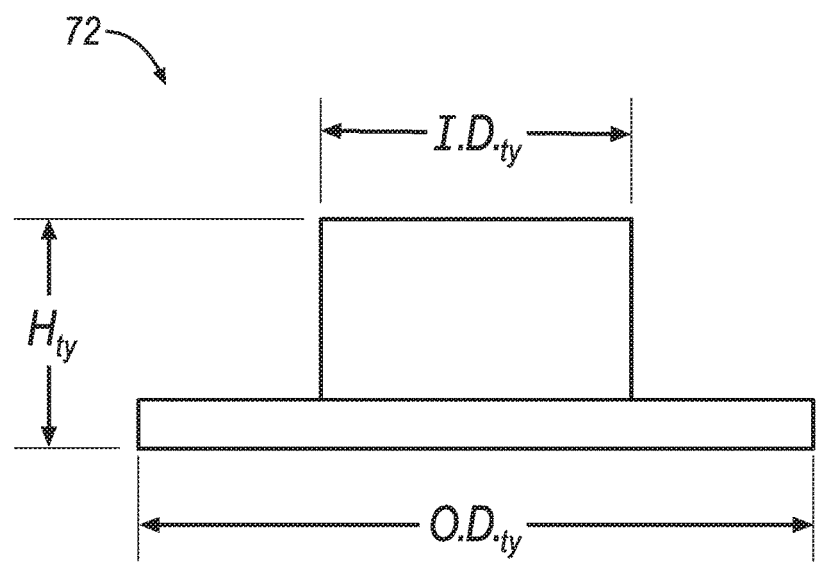
FIG. 10B is an isometric view of an example T-yoke component of an example tactile transducer.

Now referring to FIG. 10B, the function of the T-yoke 72 is to transfer the magnetic field lines into a useable configuration which is perpendicular to the current running in the coil 70. The T-yoke 72 also provides the ability to mount the magnet 74 and top plate 76. The T-yoke 72 may be made of a metal material, such as steel. In some examples, the T-yoke 72 may have an inner diameter I.D.$_{ty}$ of about 30 mm, an outer diameter O.D.$_{ty}$ of about 50 mm and a height H$_{ty}$ of about 14 mm.

Figure 10C:
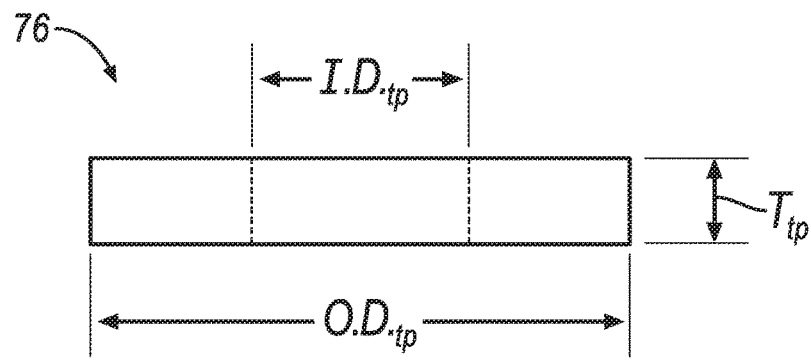
FIG. 10C is a perspective view of an example top plate component of an example tactile transducer.

Now referring to FIG. 10C, an example top plate 76 is shown. The top plate 76 transmits the magnet flux from the magnet 74 in a perpendicular direction to the coil 70. The top plate 76 may be made of a metal material, such as steel. In some examples, the top plate 76 may have an inner diameter I.D.$_{tp}$ of about 36 mm, an outer diameter O.D.$_{tp}$ of about 50 mm, and a thickness T$_{tp}$ of about 7 mm.

Figure 10D:
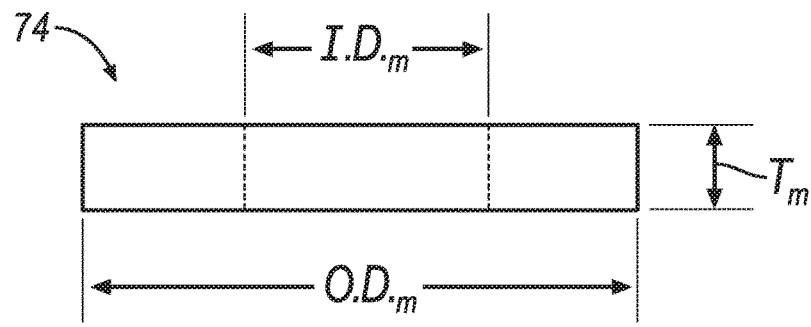
FIG. 10D is a perspective view of an example magnet component of an example tactile transducer.

Now referring to FIG. 10D, an example magnet 74 is shown. The magnet 74 is configured to be moveable thereby generating movements that are felt by the user 16. Furthermore, magnetic flux density is dependent on the magnetic material used. In some configurations, rare earth magnetic neodymium is used for maximum flux density. More specifically Neodymium N52 may be used. In some examples, the magnet 74 may have an inner diameter I.D.$_m$ of about 38 mm, an outer diameter O.D.$_m$ of about 50 mm, and a thickness T$_m$ of about 4 mm.

Figure 10E:
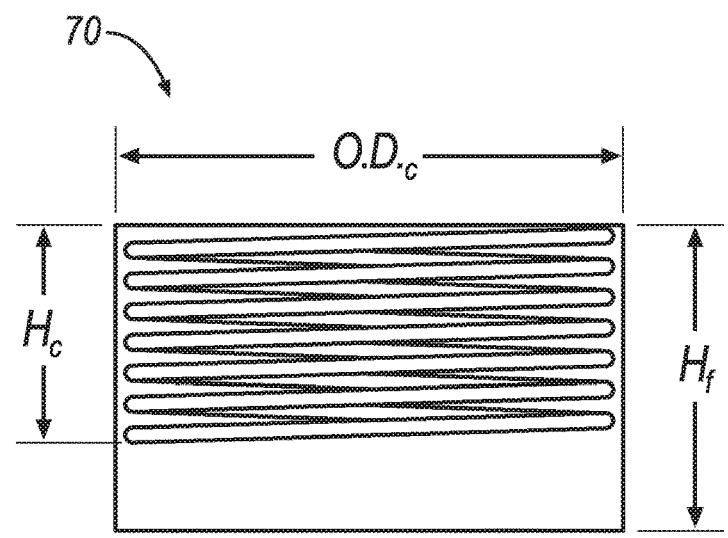
FIG. 10E is a perspective view of an example coil of an example tactile transducer.

Now referring to FIG. 10E, an example electrical coil 70 is shown. The coil 70 is configured to have a resistance of greater than approximately 30 ohms and a current draw of approximately 0.4 amps or less. FIG. 10F illustrates some of the parameters of the coil 70 depicted in FIG. 10E. For instance, the coil 70 may have an outer diameter O.D.$_c$ of about 31 mm, a former height H$_f$ of about 14 mm, and a coil height H$_e$ of about 9 mm. In some examples, the coil 70 is wrapped numerous times by a solid copper wire with a diameter of about 0.16 mm, and total length of about 42,000 mm.

Figure 10G:
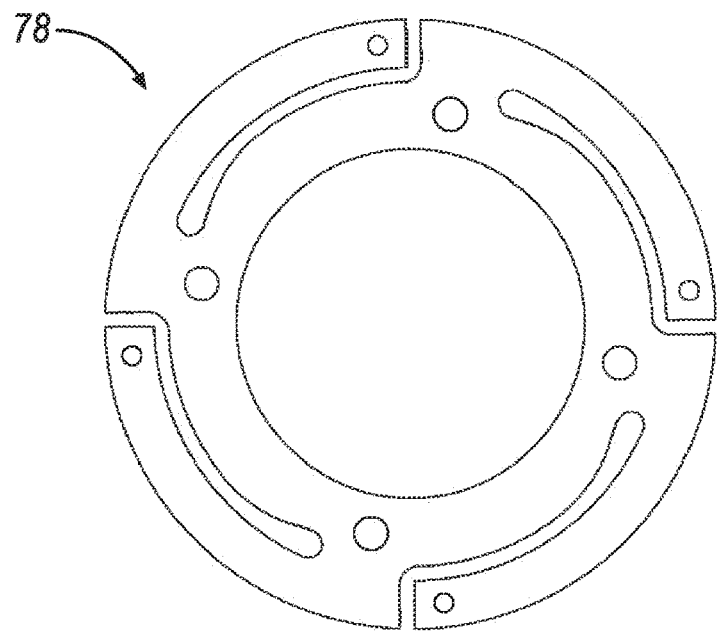
FIG. 10G is a top plan view of an example spring disc component of an example tactile transducer.
Figure 10H:
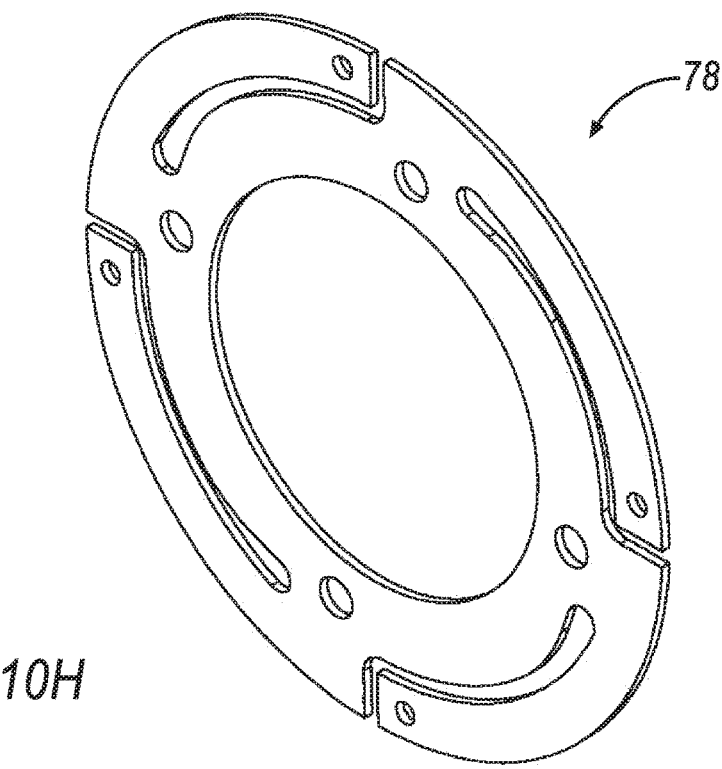
FIG. 10H is an isometric view of an example spring disc component of an example tactile transducer.

Now referring to FIG. 10G and FIG. 10H, an example spring disc 78 is shown. The spring disc 78 provides a datum around which the magnet 74 can freely oscillate around. The spring disc 78 may be made of a metal material, such as steel.

Figure 11:
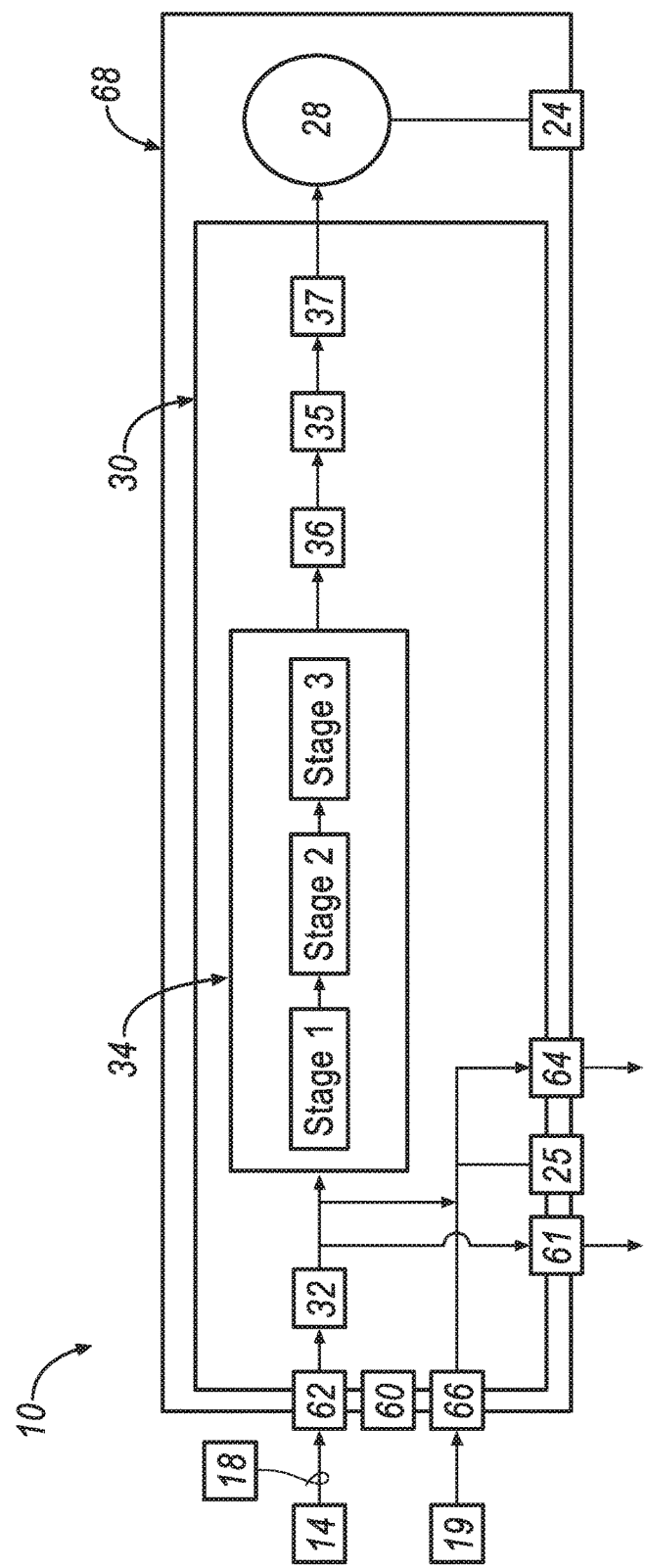
FIG. 11 is an electrical block diagram of the system components of an example tactile feedback device.

FIG. 11 shows the inner workings of an example tactile feedback response device 10. The device 10 includes a circuit board 30, a transducer potentiometer 24, an audible control 25, an electrical signal input connection 62, an electrical power source input connection 60, an audio input connection 66, a headphone output connection 64, a through output connection 61, a tactile transducer 28 and a housing 68.

The circuit board 30 is communicably coupled to all of the device's 10 electrical components. For instance, the circuit board 30 includes an electronic buffer circuit 32, a frequency filter circuit 34 and an electronic power amplifier circuit 36. The circuit board 30 is configured to include an arrangement of capacitors, resistors, inductors, integral signal and power traces and connections.

In some examples, the musical instrument 14 generates electrical signals 18 that are transmitted to the device 10. The electrical signals 18 are received by the electrical signal input connection 62, and are transferred to the circuit board 30. Whereby, the electrical signals 18 pass through the buffer circuit 32. The buffer circuit 32 is configured to provide a buffer to the electrical signals 18 received from the musical instrument 14 by incorporating an impedance of greater than approximately 1,000,000 ohms.

Next, the electrical signals 18 are transmitted to the frequency filter circuit 34. The frequency filter circuit 34 is configured to pass the electrical signals 18 received from the buffer circuit 32 with frequencies in the range of approximately 1-130 Hz. In some examples, this frequency range is defined as the signal degrading by 3 dB at the low and high ends.

Furthermore, in some implementations, wherein the musical instrument is a bass guitar, the frequency filter circuit 34 may be configured to pass the electrical signals 18 received from the buffer circuit 32 with frequencies in the ranges of approximately 20-100 Hz or 30-80 Hz. In some examples, wherein the musical instrument is an electric guitar, the frequency filter circuit 34 may be configured to pass the electrical signals 18 received from the buffer circuit 32 with frequencies in the ranges of approximately 60-330 Hz, 80-240 Hz or 100-200 Hz.

In some configurations the frequency filter circuit 34 may be a band pass filter. The band pass filter may consist of three stages, wherein each stage performs a different function such as filtering the electrical signals 18 with frequencies below or above a certain threshold, and providing amplification to the electrical signals 18. In some instances, the first stage consists of a high frequency pass filter, the second stage consists of an electrical signal amplifier, and the third stage consists of a low frequency pass filter.

Subsequent to the electrical signals 18 passing through the frequency filter circuit 34, the electrical signals 18 pass through the amplifier circuit 36. The amplifier circuit 36 is configured to increase the power of the electrical signals 18 received from the frequency filter circuit 34 to approximately 20 watts or less, in order to sufficiently actuate the tactile transducer 28.

In some examples, prior to actuating the tactile transducer 28, the electrical signals 18 are inverted for a bridge-tied load (BTL) connection 35, and then passed to a class-D power amplifier 37 (also known as a switching amplifier).

In some implementations, the device 10 may be configured to include an electrical signal through output connection 61. Wherein, after the electrical signals 18 pass through the buffer circuit 32, they are outputted, from the device 10, to downstream components external to the device 10. These components may include an amplifier, a pedal board, a wireless pack, etc. This function gives the musician the capability to use the device 10 not only for tactile feedback response generation, but also to adequately pass the electrical signals 18 to any desired components. The electrical signals 18 may be simultaneously outputted by the through output connection 61 and passed to the frequency filter circuit 34.

In some examples, the audio input connection 66 is configured to receive input signals, such as electrical signals, from music signal sources 19. The music signal sources may include drums, keyboard, guitar, computer, sound mixer, etc. The audio input connection 66 is communicatively coupled to the circuit board 30.

Now referring to FIG. 12, in some implementations, a tactile feedback response device 10, may include a housing 68, a transducer potentiometer 24, an audible control 25, an electrical signal input connection 62, an electrical power source input connection 60, an audio input 66, a headphone output connection 64, a through output connection 61, and an attachment apparatus 26. The electrical signal input connection 62 is configured to receive a cable or wire from the musical instrument 14. The musical instrument 14 generates electrical signals 18 which are transmitted to the device 10 via the cable or wire. The electrical power source input connection 60 is configured to receive a cable or wire from a power source 20. The power source 20 transmits power to the device via the cable or wire.

The headphone output connection 64 is configured to be detachably coupled to headphones, wherein audio is outputted from the device 10 and can be heard by the user 16. The outputted audio may consist of sound solely from the musical instrument 14, sound from the musical instrument 14 mixed with other music signal sources 19, or sound solely from the music signal sources 19. Sounds from the music signal sources 19 are received by the audio input connection 66. The headphone output connection 64 is communicatively coupled to the circuit board 30.

In some implementations, the audible control 25 is configured to control the volume of the output of the headphone output connection 64. Moreover, the device 10 is firmly attached to the strap 12, via the attachment apparatus 26, which in this example consists of two clips.

In some configurations, it is desirable for the device 10 to be independent from a wired power source. Using a battery source, e.g. lithium-ion battery, is ideal. Lithium-ion batteries have a high power density. Longevity is critical for a user 16, e.g. musician performing, so the device 10 is designed to have a low power draw.

In some examples, the device 10 may include a through output connection 61, which is configured to output certain electrical signals, in which the outputted signals have approximately greater than 95 percent fidelity. The outputted signals are subsequently capable of being transmitted to numerous components downstream, such as an amplifier, a pedal board, a wireless pack, etc. The through output connection 61 is configured to be detachably connected to these components.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A device for providing a tactile feedback response to a user, comprising:
   an electrical circuit, the electrical circuit including a frequency filter circuit and an amplifier circuit;
   a tactile transducer electrically coupled to the amplifier circuit, the tactile transducer including an electrical coil, the electrical coil having a resistance of greater than approximately 30 ohms and a current draw of approximately 0.4 amps or less;
   an input connection configured to receive an electrical signal, and the input connection is communicatively coupled to the electrical circuit; and
   a support strap for supporting a musical instrument, the tactile transducer is detachably connected to the support strap by an attachment apparatus;
   wherein the electrical circuit transforms the electrical signal making it suitable for moving at least a portion of the tactile transducer, at least indirectly, against a portion of the user's body.

2. The device of claim 1, wherein the amplifier circuit is capable of increasing the power of the electrical signal to approximately 20 watts.

3. The device of claim 1, wherein the tactile feedback response to the user is not dependent on the transmission of acoustic energy between the tactile transducer and the user's body.

4. The device of claim 1, wherein the frequency filter circuit is configured to pass the electrical signals with frequencies in the range of 10-130 Hz.

5. The device of claim 1, wherein the tactile transducer further includes a magnet and the magnet is moveable by current passing through the electrical coil thereby generating movement that is felt, at least indirectly, by the user.

6. The device of claim 1, wherein the tactile transducer is encased within the support strap.

7. The device of claim 1, further comprising:
   a headphone output connection communicatively coupled to the electrical circuit, and configured to be detachably coupled to headphones, wherein an output electrical signal which replicates the electrical signal outputted from the headphone output connection can be monitored by the user;
   a through output connection configured to output electrical signals to downstream components;
   the through output connection is communicatively coupled to the electrical circuit;
   an audio input connection configured to receive an electrical signal from at least one music signal source, the audio input connection is communicatively coupled to the electrical circuit; and
   a means for urging, at least indirectly, the tactile transducer against the user's body.

8. A method for providing a tactile feedback response to a user, comprising:
   connecting a device to a strap of a musical instrument by means of an attachment apparatus;
   receiving, at the device, electrical signals generated by the musical instrument, the device including an electrical circuit and a tactile transducer;
   transforming, at the device, the electrical signals received from the musical instrument into a tactile feedback response; and
   conveying the tactile feedback response to the user, whereby the device generates vibrations that are felt by the user.

9. The method of claim 8, wherein the tactile transducer includes a coil and a magnet, the coil is configured to have a resistance of greater than approximately 30 ohms and a current draw of approximately 0.4 amps or less, and the magnet is configured to be moveable thereby generating vibrations that are felt by the user.

10. The method of claim 8, further including encasing the device within the strap of the musical instrument.

11. A system for providing a tactile feedback response to a user, comprising:
   a musical instrument configured to generate electrical signals; and
   a device detachably connected to a strap of the musical instrument by means of an attachment apparatus, and configured to receive and transform the electrical signals generated by the musical instrument into a tactile feedback response, the device including an electrical circuit and a tactile transducer,
   wherein the device conveys the tactile feedback response to the user by generating non-acoustic vibrations that are felt by the user.

12. The system of claim 11, wherein the tactile transducer includes a coil and a magnet, the coil is configured to have a resistance of greater than approximately 30 ohms and a current draw of approximately 0.4 amps or less, and the magnet is configured to be moveable thereby generating vibrations that are felt by the user.

13. The system of claim 11, wherein the device is encased within the strap of the musical instrument.

14. A device for providing a tactile feedback response to a user, comprising:
   an electrical circuit, the electrical circuit including a frequency filter circuit and an amplifier circuit;
   a tactile transducer electrically coupled to the amplifier circuit and detachably connected directly to a musical instrument, the tactile transducer including an electrical coil, the electrical coil having a resistance of greater than approximately 30 ohms and a current draw of approximately 0.4 amps or less; and
   an input connection configured to receive an electrical signal and the input connection is communicatively coupled to the electrical circuit;
   wherein the electrical circuit transforms the electrical signal making it suitable for moving at least a portion of the tactile transducer, at least indirectly, against a portion of the user's body.

15. A method for providing a tactile feedback response to a user, comprising:
   detachably connecting a device directly to a musical instrument;
   receiving, at the device, electrical signals generated by the musical instrument, the device including an electrical circuit and a tactile transducer;
   transforming, at the device, the electrical signals received from the musical instrument into a tactile feedback response; and
   conveying the tactile feedback response to the user, whereby the device generates vibrations that are felt by the user.

16. A system for providing a tactile feedback response to a user, comprising:
   a musical instrument configured to generate electrical signals; and
   a device detachably connected directly to the musical instrument, and configured to receive and transform the electrical signals generated by the musical instrument into a tactile feedback response, the device including an electrical circuit and a tactile transducer,
   wherein the device conveys the tactile feedback response to the user by generating non-acoustic vibrations that are felt by the user.

\* \* \* \* \*